(12) United States Patent
Holley et al.

(10) Patent No.: US 6,717,786 B2
(45) Date of Patent: Apr. 6, 2004

(54) AUTOMATIC VOLTAGE SOURCE SELECTOR FOR CIRCUIT BREAKERS UTILIZING ELECTRONICS

(75) Inventors: Robert D. Holley, Shoreline, WA (US); Mark S. Shander, Lynnwood, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 10/001,636

(22) Filed: Oct. 30, 2001

(65) Prior Publication Data

US 2003/0081360 A1 May 1, 2003

(51) Int. Cl.[7] .............................. H02H 3/08; H02J 9/00
(52) U.S. Cl. ........................................ 361/93.1; 307/64
(58) Field of Search .................... 361/82–84, 245–246; 307/37–38, 127, 135, 138

(56) References Cited

U.S. PATENT DOCUMENTS

| | | |
|---|---|---|
| 3,911,323 A | 10/1975 | Wilson et al. |
| 4,297,738 A | 10/1981 | Lee |
| 4,356,443 A | 10/1982 | Emery |
| 4,396,794 A | 8/1983 | Stiller |
| 4,396,968 A | 8/1983 | Stiller |
| 4,398,057 A | 8/1983 | Shankle et al. |
| 4,466,071 A | 8/1984 | Russell, Jr. |
| 4,562,506 A | 12/1985 | Moran |
| 4,607,309 A | 8/1986 | Bishop |
| 4,639,817 A | 1/1987 | Cooper et al. |
| 4,871,971 A | 10/1989 | Jeerings et al. |
| 5,047,724 A | 9/1991 | Boksiner et al. |
| 5,121,282 A | 6/1992 | White |
| 5,185,684 A | 2/1993 | Beihoff et al. |
| 5,185,687 A | 2/1993 | Beihoff et al. |
| 5,223,795 A | 6/1993 | Blades |

(List continued on next page.)

FOREIGN PATENT DOCUMENTS

| | | |
|---|---|---|
| EP | 2 336 786 | 12/1975 |
| EP | 0 791 999 A1 | 2/1997 |

*Primary Examiner*—Brian Sircus
(74) *Attorney, Agent, or Firm*—Black Lowe & Graham PLLC

(57) ABSTRACT

Methods and systems for selecting and connecting an electronics package to a power source from one or more of a plurality of possible power source paths. An embodiment of the invention uses inexpensive analog components to select a power path by testing the possible power source paths for a desired potential. The invention interrupts the alternate power path while maintaining the connection of the electronics package to the power source through the selected power path. An optional removal circuit removes the testing and selection circuitry once the alternate power path is interrupted. In actual embodiment of the invention, the methods and systems described are included in a reversible circuit breaker.

25 Claims, 5 Drawing Sheets

U.S. PATENT DOCUMENTS

| | | |
|---|---|---|
| 5,224,006 A | 6/1993 | MacKenzie et al. |
| 5,245,498 A | 9/1993 | Uchida et al. |
| 5,307,230 A | 4/1994 | MacKenzie |
| 5,373,241 A | 12/1994 | Ham, Jr. et al. |
| 5,420,740 A | 5/1995 | MacKenzie et al. |
| 5,432,455 A | 7/1995 | Blades |
| 5,434,509 A | 7/1995 | Blades |
| 5,452,223 A | 9/1995 | Zuercher et al. |
| 5,453,723 A | 9/1995 | Fello et al. |
| 5,459,630 A | 10/1995 | MacKenzie et al. |
| 5,477,150 A | 12/1995 | Ham, Jr. et al. |
| 5,483,211 A | 1/1996 | Carrodus et al. |
| 5,506,789 A | 4/1996 | Russell et al. |
| 5,512,832 A | 4/1996 | Russell et al. |
| 5,519,561 A | 5/1996 | Mrenna et al. |
| 5,561,605 A | 10/1996 | Zuercher et al. |
| 5,578,931 A | 11/1996 | Russell et al. |
| 5,600,526 A | 2/1997 | Russell et al. |
| 5,602,709 A | 2/1997 | Al-Dabbagh |
| 5,659,453 A | 8/1997 | Russell et al. |
| 5,682,101 A | 10/1997 | Brooks et al. |
| 5,691,869 A | 11/1997 | Engel et al. |
| 5,706,154 A | 1/1998 | Seymour |
| 5,726,577 A | 3/1998 | Engel et al. |
| 5,729,144 A | 3/1998 | Cummins |
| 5,729,145 A | 3/1998 | Blades |
| 5,783,964 A * | 7/1998 | Eitan .................... 327/408 |
| 5,805,397 A | 9/1998 | MacKenzie |
| 5,805,398 A | 9/1998 | Rae |
| 5,815,352 A | 9/1998 | Mackenzie |
| 5,818,237 A | 10/1998 | Zuercher et al. |
| 5,825,598 A | 10/1998 | Dickens et al. |
| 5,831,509 A | 11/1998 | Elms et al. |
| 5,835,321 A | 11/1998 | Elms et al. |
| 5,854,590 A | 12/1998 | Dalstein |
| 5,886,861 A | 3/1999 | Parry |
| 5,889,643 A | 3/1999 | Elms |
| 5,896,262 A | 4/1999 | Rae et al. |
| 5,905,619 A | 5/1999 | Jha |
| 5,933,305 A | 8/1999 | Schmalz et al. |
| 5,940,256 A | 8/1999 | MacKenzie et al. |
| 5,963,405 A | 10/1999 | Engel et al. |
| 5,963,406 A | 10/1999 | Neiger et al. |
| 5,969,920 A | 10/1999 | Mackenzie |
| 5,969,921 A | 10/1999 | Wafer et al. |
| 5,973,896 A | 10/1999 | Hirsh et al. |
| 5,982,593 A | 11/1999 | Kimblin et al. |
| 5,986,860 A | 11/1999 | Scott |
| 5,999,385 A | 12/1999 | Fello et al. |
| 6,014,297 A | 1/2000 | Clarey et al. |
| 6,031,699 A | 2/2000 | Dollar, II et al. |
| 6,034,611 A | 3/2000 | Brooks et al. |
| 6,052,046 A | 4/2000 | Ennis et al. |
| 6,057,997 A | 5/2000 | Mackenzie et al. |
| 6,084,756 A | 7/2000 | Doring et al. |
| 6,088,205 A | 7/2000 | Neiger et al. |
| 6,128,169 A | 10/2000 | Neiger et al. |
| 6,128,170 A | 10/2000 | Daum |
| 6,198,611 B1 | 3/2001 | Macbeth |
| 6,215,378 B1 | 4/2001 | Gibson et al. |
| 6,225,883 B1 | 5/2001 | Wellner et al. |
| 6,229,679 B1 | 5/2001 | Macbeth |
| 6,232,857 B1 | 5/2001 | Mason, Jr. et al. |

* cited by examiner

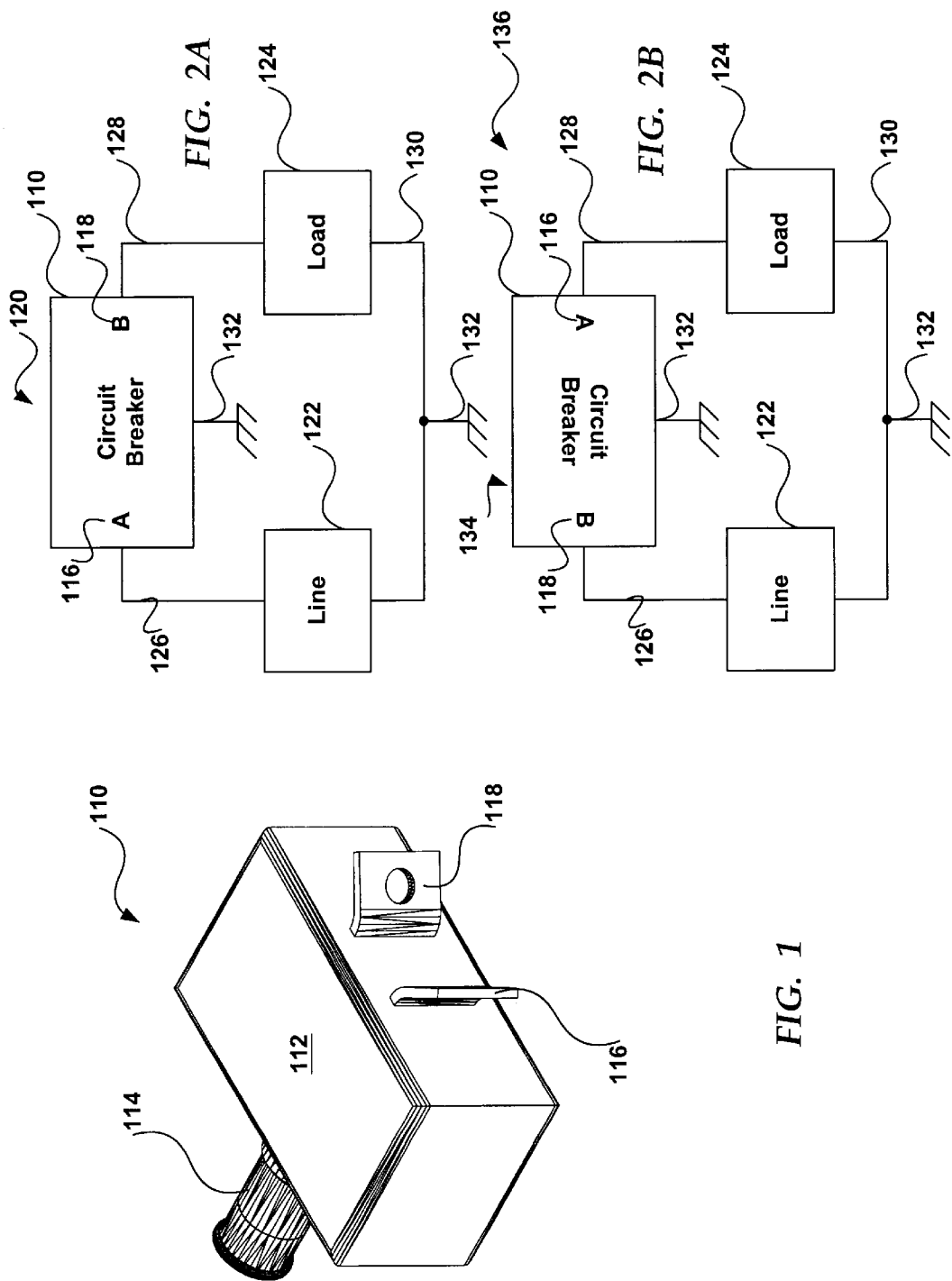

AUTOMATIC VOLTAGE SOURCE SELECTOR FOR CIRCUIT BREAKERS UTILIZING ELECTRONICS

FIELD OF THE INVENTION

This invention relates generally to electrical circuit breakers and, more specifically, to electrical circuit breakers including electronic components.

BACKGROUND OF THE INVENTION

Electrical circuit breakers interrupt the current flow in electrical circuits when the circuit breaker detects a fault in the electrical circuit. Most circuit breakers rely on the heat induced in a bimetal conductor by excess current to deform the bimetal conductor, which induces a mechanical action that physically breaks the circuit. These circuit breakers are often referred to as "thermal" circuit breakers. Recent improvements to circuit breakers utilize electronics to detect circuit faults that a purely thermal circuit breaker may not respond to, in part because the faults do not necessarily result in a sustained over-current situation. Examples of these circuit faults include arc faults and ground faults. If the electronics detect a fault condition, the electronics generate a signal that "trips" the circuit breaker, generally by activating a solenoid that induces a mechanical action to physically break the circuit. Not only do the electronics provide the means to detect these fault conditions, they permit the circuit breaker to respond to these conditions long before an over-current situation develops—if such an over-current situation develops at all.

No longer simple electromechanical devices, the electronics in present day circuit breakers must be powered. A challenge is that the electronics should be powered in such a way that there is not a conductive path bridging the break in the circuit provided by the circuit breaker when the circuit breaker is in the off position or has been tripped. Presumably, this means powering the electronics from one or the other side of the physical separation provided by the circuit breaker. Generally, the side connected to the power source is referred to as the "line" side, while the other side is referred to as the "load" side. When the circuit breaker is turned "on" or "reset," the line side is electrically connected to the load side, forming the circuit that the circuit breaker protects. When the circuit is complete or "closed" (the circuit breaker is on), whether the electronics are powered from the line side or the load side may make little difference. However, when the circuit is incomplete or "open" (the circuit breaker is off or tripped), the side from which the electronics are powered determines whether the electronics actually receive power while the circuit breaker is in the open condition. This has practical consequences, for instance, if the electronics are powered from the load side, there is a latency in protection by the electronics from the time that the circuit breaker is turned on until the electronics "power up" to their useful state. This is particularly important in a "reset" situation, where the circuit breaker may have previously detected a fault that caused the circuit breaker to trip. Insuring that the electronics are powered from the line side (or the load side, as the application may dictate), is often a design and implementation requirement for a circuit breaker.

In the airplane industry, circuit breaker mounting locations are keyed to accept thermal circuit breakers in one specific orientation. Once the circuit breakers have been mounted in a panel, one electrical terminal is bolted to a solid line bus bar while the other terminal receives a terminal lug crimped onto a load wire. Prior to the introduction of electronic components into circuit breakers, the electromechanical basis of a thermal circuit breaker made the orientation of the line and load connections with respect to the terminals of the circuit breaker irrelevant. This led panel designers to route line buses and load wires in the most convenient configuration possible, many times interchanging the orientation of the line and load terminals with respect to the keyed mounting locations of the circuit breakers.

Densely packed circuit breaker panels, keyed mounting locations, solid line bus bars, and tightly secured wire bundles make retrofitting these panels to accept circuit breakers that require a specific orientation a difficult and expensive proposition. Instead of reconfiguring a circuit breaker panel, one could provide a different circuit breaker for each orientation and current rating, e.g., one part for line bus configuration "A" and another separate part for line bus configuration "B". This at least doubles the part number quantities, causing additional expense for manufacturing, ordering and inventory, among other things. More importantly, the improper installation of circuit breakers can defeat the added safety afforded by the fault detection circuitry in the improved circuit breakers.

There exists a need for a reversible circuit breaker that includes fault detection electronics. The reversible circuit breaker preferably should include an automatic voltage source selector to set a power source path to its electronics package. Preferably, the automatic voltage source selector automatically detects a power source path from among a plurality of power source paths and then either (or both) selects the power path to be connected to the electronics package or severs the connections to the alternative paths. The present invention provides the solution to these needs.

SUMMARY OF THE INVENTION

The invention provides systems and methods for connecting an electronics package to an electrical path, while maintaining and fixing appropriate electrical isolation from other electrical paths. Among the many uses of the invention, the automatic power source selector is advantageously used in reversible circuit breakers having electronic fault detection components that require a connection to a power source. A circuit breaker that includes the invention may be installed in a plurality of orientations and will automatically connect the fault detection electronics to the appropriate power supply path.

The present invention comprises a system for selecting a power path from among a plurality of available power paths, connecting power paths and disconnecting unselected power paths, as required. A power source selection circuit is included in a reversible circuit breaker. The power source selection circuit detects the presence of a voltage on a one side of the reversible circuit breaker and disables the power path from a second side of the reversible circuit breaker to an electronics package included in the reversible circuit.

An inexpensive analog embodiment of the power source selection circuit is provided. The inexpensive analog embodiment uses power available on a first path to automatically detect and permanently interrupt a second power path. Power available from both power paths is used to remove the power source selection circuit from their connection to the power paths after the second power path is permanently interrupted.

The invention also provides a method to select a power path from a plurality of power paths and to automatically connect a selected path and/or disconnect an unselected path from an electronics package. The method tests the available power paths for a desired potential and then electrically isolates some or all of the remaining power paths. A method for installing a reversible circuit breaker that includes the present invention is also provided.

BRIEF DESCRIPTION OF THE DRAWINGS

The preferred and alternative embodiments of the present invention are described in detail below with reference to the following drawings.

FIG. 1 is an isometric view of an exemplary reversible circuit breaker that includes the present invention;

FIG. 2A is a block diagram of the reversible circuit breaker coupled in a circuit in a first orientation;

FIG. 2B is a block diagram of the reversible circuit breaker coupled in a circuit in a second orientation;

DETAILED DESCRIPTION OF THE INVENTION

Figure 3:
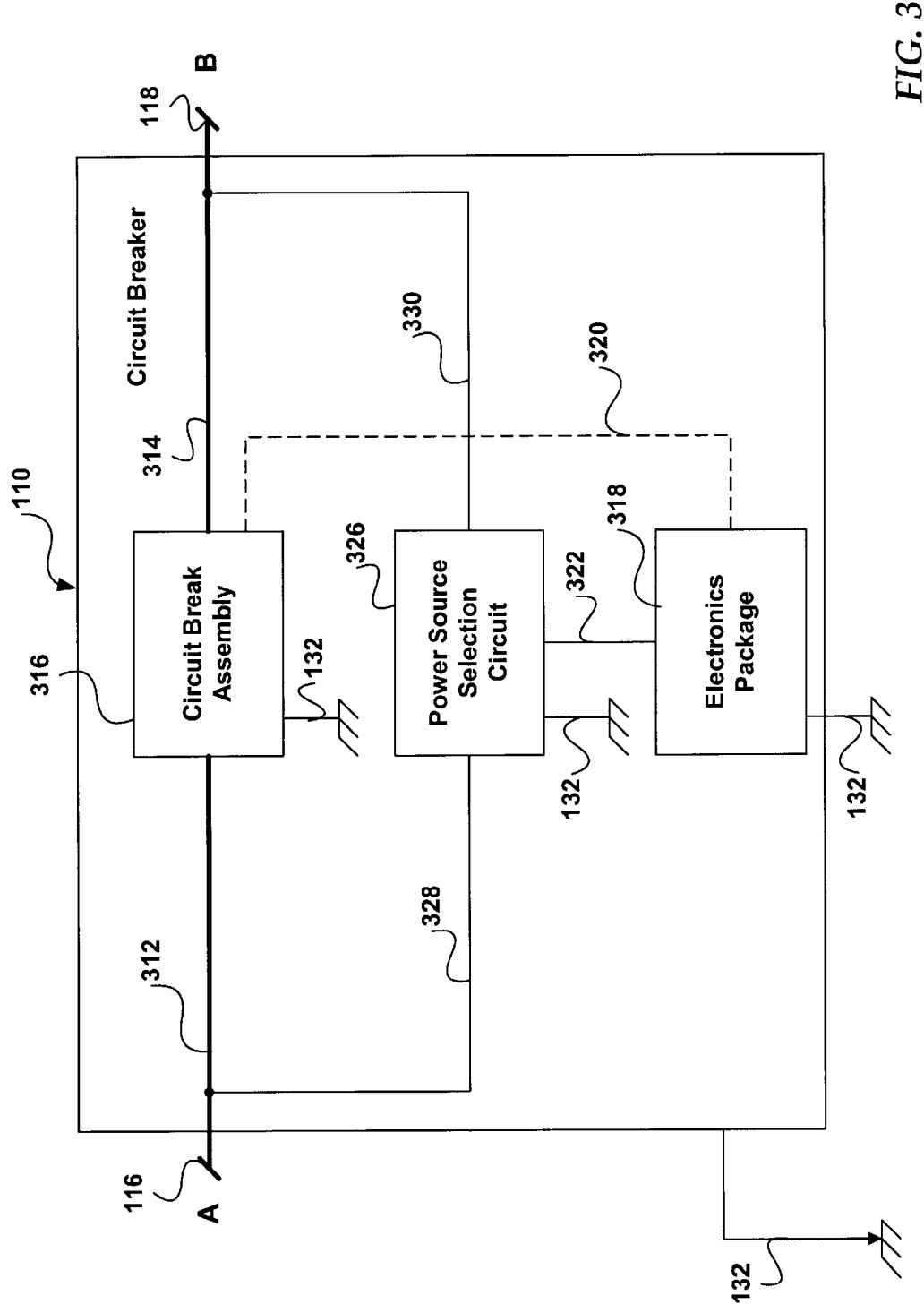
FIG. 3 is a block diagram of the reversible circuit breaker.

An exemplary reversible circuit breaker 110 is illustrated in FIG. 1. The reversible circuit breaker 110 includes a housing 112, a reset button or lever 114 and terminals 116 and 118, and a ground connection (not shown). Solely for convenience in the following discussion, terminal 116 will be referred to as A-side terminal 116 and terminal 118 will be referred to as B-side terminal 118. The present invention makes the A-side terminal 116 and B-side terminal 118 interchangeable as is illustrated in FIGS. 2A and 2B. The reversible circuit breaker 110 is shown in block format in FIG. 2A in a first orientation 120. In the first orientation 120 A-side terminal 116 is connected to a line 122 and the B-side terminal 118 is coupled to a load 124. The line 122 may be any AC or DC power source. The load 124 is generally any device or component requiring power to operate. The reversible circuit breaker 110 protects the circuit comprising the line 122, the line-side path 126, the reversible circuit breaker 110, the load-side path 128, the load 124 and the neutral or common path 130. The reversible circuit breaker 110 has a ground path 132 that may be shared by the neutral or ground path 130, depending upon the application.

FIG. 2B shows the reversible circuit breaker 110 in a second orientation 134. In the second orientation 134, the reversible circuit breaker 110 is "reversed" in circuit 136 so that the B-side terminal 118 is coupled to the line 122 through line path 126 and A-side terminal 116 is coupled to the load 124 through load-side path 128. As will become apparent in the following discussion the present invention is not limited to two terminals or two orientations. For example, a circuit breaker with a circular housing and a plurality of terminals could be inserted into a circuit such as circuit 136 in a plurality of orientations while retaining the benefit of the present invention.

The reversible circuit breaker 110 of the present invention is shown in block diagram format in FIG. 3. When closed, the reversible circuit breaker 110 conducts electricity along a circuit path comprising an A-side circuit path 312 and a B-side circuit path 314. A circuit break assembly 316 is interposed between the A-side circuit path 312 and the B-side circuit path 314 such that the circuit break assembly 316 can interrupt the electrical connection between the A-side circuit path 312 and the B-side circuit path 314. The circuit break assembly is generally an electromechanical mechanism that either completes the circuit path by engaging a first contact that is coupled to the A-side circuit path 312 with a second contact that is coupled to the B-side circuit path 314. Conventional circuit break assemblies utilize a bimetallic conductor that deforms in response to heat induced in the circuit by excess current flow. The bimetallic conductor causes a mechanical action that separates the first contact from the second contact, thereby interrupting the circuit path.

The reversible circuit breaker 110 also includes an electronics package 318 that detects various fault conditions in the circuit path 136 being protected by the reversible circuit breaker 110. For example, the electronics package 318 may include electronics that detect a ground fault or an arc fault. When the fault is detected, the electronics package 318 activates the circuit break assembly 316 via connection 320. The electronics package can detect, monitor or control other aspects of the circuit and is not limited to fault detection.

The electronics package 318 has a power connection 322 and a ground connection 132. A power source selection circuit 326 supplies power to the electronics package 318 via the power source connection 322. The power source selection circuit 326 is coupled to the A-side terminal 116 via an A-side power path 328. Similarly, the power source selection circuit 326 is coupled to the B-side terminal 118 through a B-side power path 330. The circuit break assembly 316, the power source selection circuit 326, the electronics package 318, and the reversible circuit breaker 110 may have a ground connection 132 as required and as would be recognized by one skilled in the art.

When the circuit break assembly 316 is closed (the first contact is engaged with the second contact), the A-side power path 328 and the B-side power path 330 will share a common potential. However, when the circuit break assembly is open (the first contact is separated from the second contact), one of the power paths 328 or 330 will be connected to the line-side path 126 while the other will be connected to the load-side path 128. The power source selection circuit 326 selects either A-side power path 328 or B-side power path 330 according to the requirements of the application, coupling the selected path to the electronics package power path 322 and severing the connection with the unselected path. The power source selection circuit may be a manual switch or an automatic selection circuit as is described in detail below. A-side power path 328 and B-side power path 330 should be electrically isolated so that an alternate circuit path is not formed when the circuit break assembly 316 is open.

Figure 4:
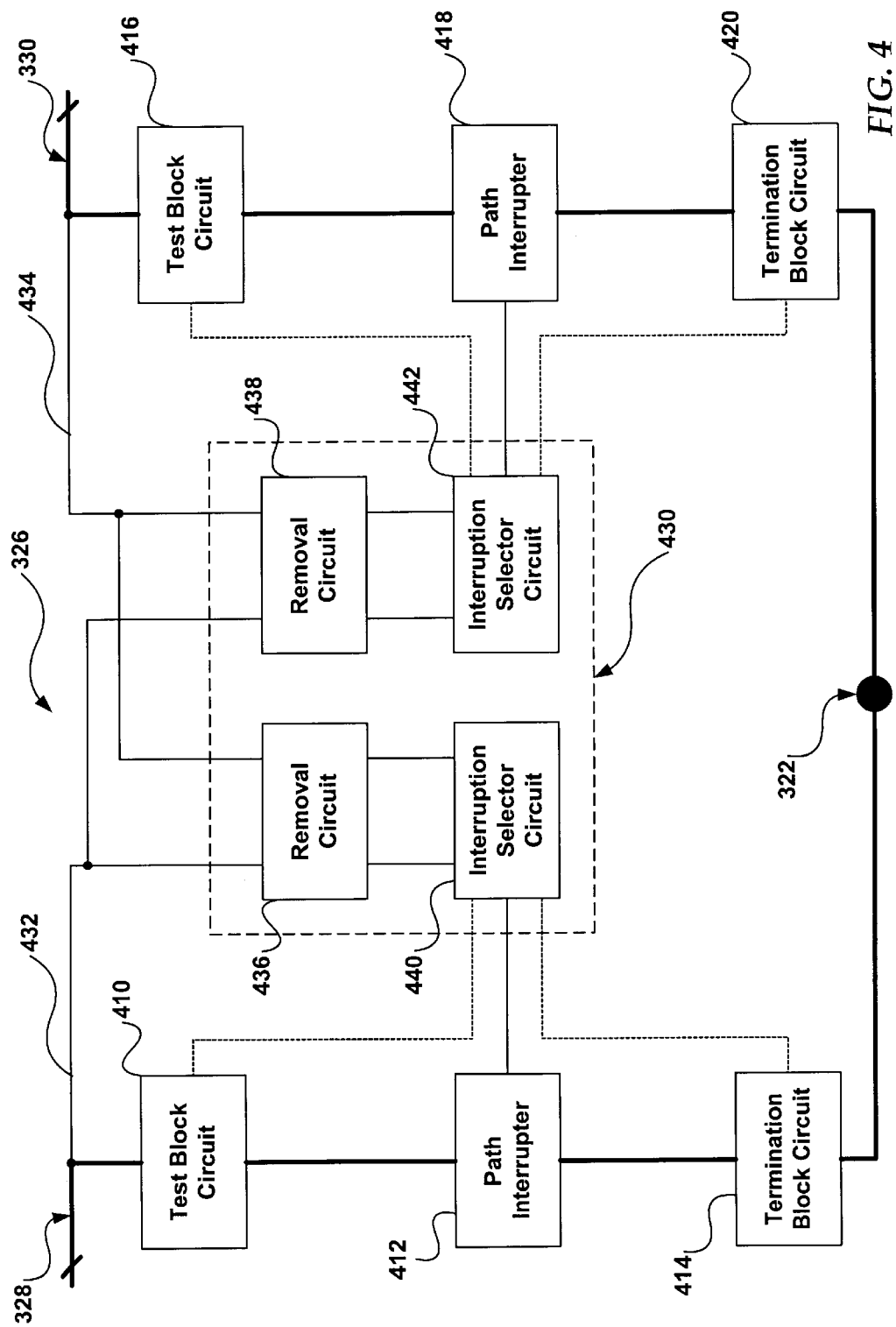
FIG. 4 is a block diagram of the power source selection circuit.

The power source selection circuit 326 is shown in more detail in FIG. 4. As indicated above, the power source selection circuit 326 is coupled to the A-side power path 328 and the B-side power path 330. The A-side power path 328 is coupled to a first side of a test block circuit 410. A second side of the test block circuit 410 is coupled to a first side of a path interrupter 412. A second side of the path interrupter 412 is coupled to a first side of a termination block circuit 414. A second side of the termination block circuit 414 is coupled to the power supply junction 322. The B-side power path 330 is symmetric to the A-side power path 328 just described, i.e., the B-side power path 330 is coupled to a first side of a test block circuit 416. A second side of the test block circuit 416 is coupled to a first side of a path interrupter 418. A second side of the path interrupter 418 is coupled to a first side of a termination block circuit 420. A second side of the termination block circuit 420 is coupled to the power supply junction 322. In other words, power paths 328 and 330 are respectively controlled by test block circuit 410, 416, path interrupter 412, 418, and termination block circuit 414, 420, any of which may block the power through their respective power paths.

As just described, A-side power path 328 and B-side power path 330 join at power junction 322. In order to select one of the power paths 328 or 330 and to disable the other, an automatic selection circuit 430 is provided. The automatic selection circuit 430 is coupled to each of the alternative power paths 328 and 330. A-side test path 432 is coupled to A-side power path 328 and B-side test path 434 is coupled to B-side power path 330. The A-side and B-side test paths 432 and 434 are coupled to each of the removal circuits 436 and 438. In some embodiments, the removal circuits may be combined (e.g., under microprocessor control) and in others it is preferable to supply separate removal circuits (e.g., in the analog embodiment shown below in FIG. 6).

Interruption selector circuit 440 is coupled to both the A-side test path 432 and the B-side test path 434 through removal circuit 436, while removal circuit 438 couples both the A-side and B-side test paths 432 and 434 to interruption selector circuit 442. Interruption selector circuit 440 is coupled to the path interrupter 412 and may also be coupled to test block circuit 410 and termination block circuit 414. Similarly, interruption selector circuit 442 is coupled to path interrupter 418 and may also be connected to test block circuit 416 and termination block circuit 420. The automatic selector circuit 430 may be implemented using a microprocessor, digital electronics, or analog components. In a microprocessor embodiment, an analog to digital converter can sample the A-side test path 432 and B-side test path 434 and cause interrupt selector circuit 440 to activate path interrupter 412 while instructing interruption selector circuit 442 to disable path interrupter 418 or to activate path interrupter 418 while instructing interruption selector circuit 440 to disable path interrupter 412.

Figure 5:
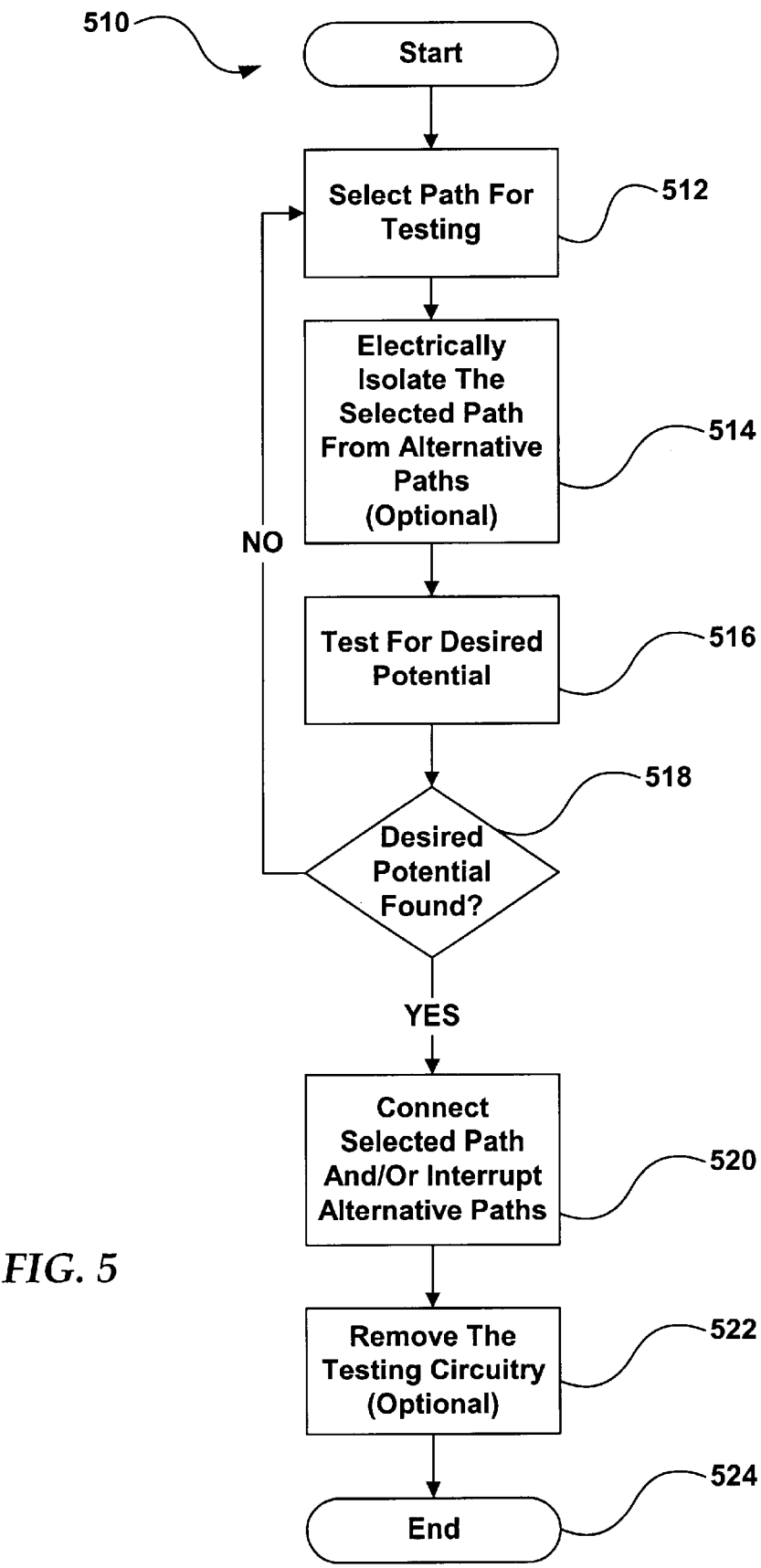
FIG. 5 is a functional flow diagram illustrating a power source path selection method, in accordance with the present invention.

A method 510 for implementing the present invention is illustrated in FIG. 5. In a block 512, an electrical path is selected for testing. This electrical path under test is electrically isolated from the other available paths in a block 514. The electrical path under test is then tested for a desired potential in a block 516. If a desired potential is not found on the electrical path under test, a decision 518 directs execution to block 512, where another electrical path is selected for testing. If the desired potential is found, the method 510 connects the path under test 520 to the electronics package 318 and/or interrupts the alternative paths. The logic circuitry used for testing may then be electrically isolated from the plurality of paths in a block 522. The method 510 ends in a block 524.

While the testing of the electrical paths is illustrated in FIG. 5 as sequential, all paths may be tested at once in block 516 and the paths connected or disconnected from the electronics package 318, as required by the particular application (block 520). In a digital embodiment, the electrical paths may be tied to the inputs of logic gates that test for the presence or absence of a desired potential on the paths. Based on the presence or absence of the desired potential, the logic can be configured to cause the output of the logic gates to activate an electronic or electromechanical switch that either closes or opens the electrical path 322 to the electronics package 318. For example, in a reversible circuit breaker, the digital logic could detect the presence of a voltage on the A-side test path 432 (and optionally the absence of a voltage on the B-side test path 434), which would cause the output of the digital logic to open an electronic or electromechanical switch (e.g., path interrupter 418) in the B-side power path 330 (and optionally close an electronic or electromechanical switch, e.g., path interrupter 412, in the A-side power path 328).

During testing in block 514, the digital logic can control an electronic or electromechanical switch (e.g., test block circuit 416) to open and isolate the A-side power path 432 from the B-side power path 434. Similarly, the digital logic can control an electronic or electromechanical switch (e.g., termination block circuit 420) to open and isolate the A-side power path 432 from the B-side power path 434 while the B-side power path is permanently interrupted. For instance, if the path interrupter 418 is a fuse or circuit breaker, opening the termination block circuit 420 protects the A-side power path 328 while an electric current of sufficient amperage is directed through the path interrupter 418 until the B-side power path 330 is interrupted (e.g., the fuse blows or circuit breaker trips). The digital logic can then optionally direct a removal circuit (e.g., 436 and 438) to remove the digital logic from the circuit, as shown in block 522. A symmetrical design allows for the selection of the B-side power path in the same way discussed above with regard to the A-side power path. In fact, any number of electrical paths can be tested in this way. Of course, instead of discrete logic, a programmable logic device, microprocessor, microcontroller, or the like, could be used.

Figure 6:
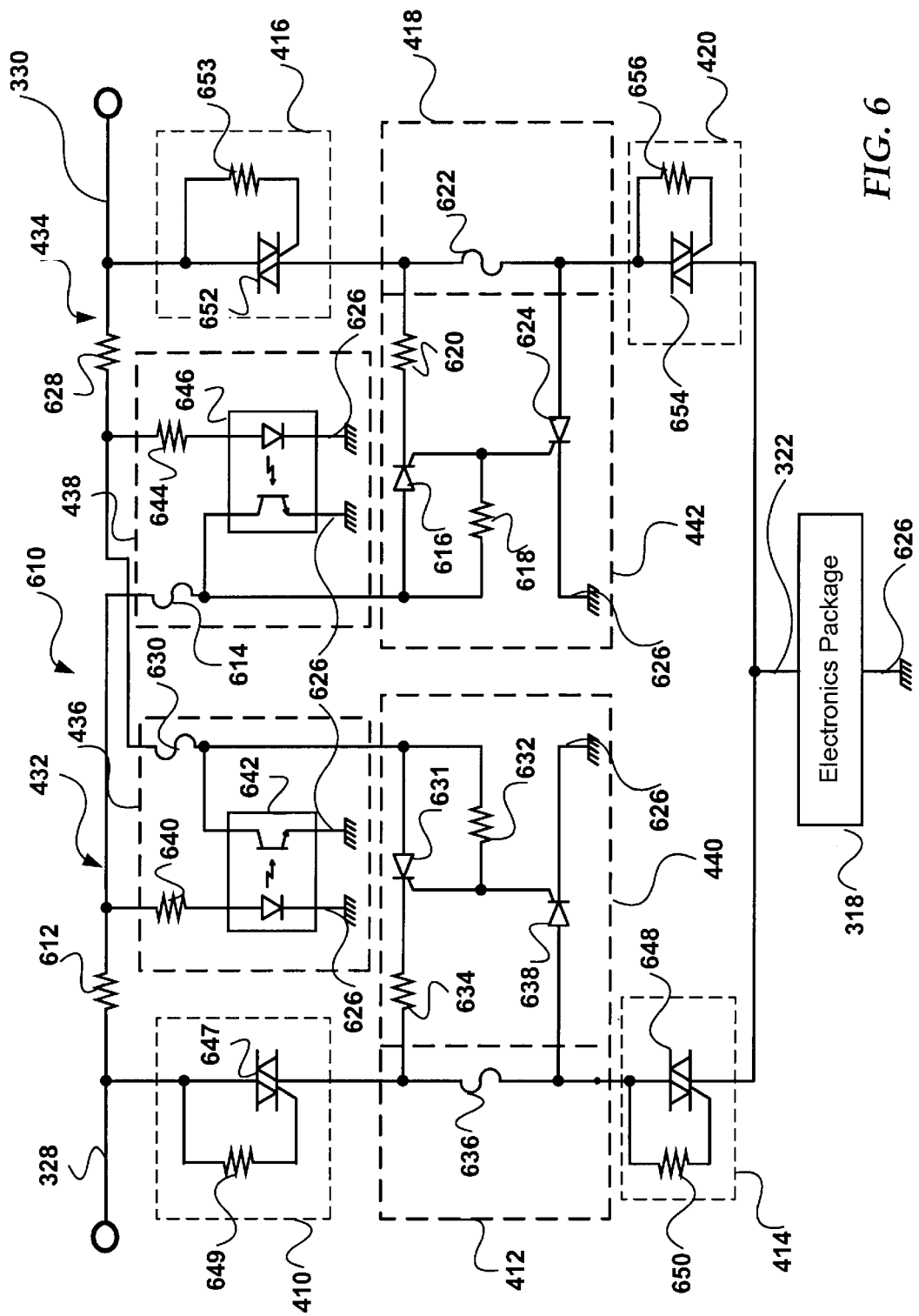
FIG. 6 is schematic diagram of an actual embodiment of the present invention.

The method 510 may also be implemented using inexpensive analog components, as is illustrated in FIG. 6. A power source selection circuit 610 utilizes inexpensive analog components to select either A-side power path 328 or B-side power path 330. A-side power path 328 is connected to a first side of a resistor 612, a second side of resistor 612 is connected to a first end of a fuse 614. A second end of fuse 614 is connected to the anode of a silicone-controlled rectifier (SCR) 616 and a first end of a resistor 618. A second end of resistor 618 is coupled to the gates of both SCR 616 and SCR 624. The cathode of SCR 616 is coupled to a first side of a resistor 620. A second side of resistor 620 is coupled to a first end of a fuse 622. A second end of fuse 622 is coupled to the anode of an SCR 624. The cathode of SCR 624 is connected to a ground 626. SCRs 616 and 624 and resistors 618 and 620 comprise an analog embodiment of the interruption selector circuit 442. The fuse 622 acts as the path interrupter 418.

The B-side test path 434 is symmetrical to the A-side test path 432. B-side power path 330 is coupled to a first end of a resistor 628. A second side of resistor 628 is coupled to a first end of a fuse 630. A second end of fuse 630 is coupled to the anode of a SCR 631 and a first end of a resistor 632. The cathode of SCR 631 is coupled to a first end of a resistor 634, the second end of the resistor 634 is coupled to a first end of a fuse 636. The second end of fuse 636 is coupled to the anode of a SCR 638. The cathode of SCR 638 is coupled to ground 626. A second end of resistor 632 is coupled to the gates of both SCR 631 and SCR 638. The SCRs 631 and 638 and resistors 632 and 634 comprise the interruption selector circuit 440 and fuse 636 acts as a path interrupter 412.

The second end of resistor 612 is also coupled to a first end of a resistor 640, the second end of resistor 640 is coupled to a control input of an opto-isolator 642. The second end of fuse 630 is coupled to an input of opto-isolator 642. The output of opto-isolator 642 is connected to ground.

The opto-isolator 642 can be modeled as a light emitting diode (LED) that activates a transistor circuit. The second end of resistor 640, therefore, drives the LED portion of the opto-isolator 642 to activate the transistor portion of opto-isolator 642 to close. The use of an opto-isolator 642 is preferred because of the superior electrical isolation that it affords between the A-side test path 432 which controls the activation of the opto-isolator 642 and the B-side test path 434 which is connected to ground by the opto-isolator when activated. Resistor 640, opto-isolator 642, and fuse 630 comprise an analog embodiment of the removal circuit 436.

An analog embodiment of the B-side removal circuit 438 includes a resistor 644 that has a first side coupled to resistor 628 and a second side coupled to a control input of an opto-isolator 646. The control input of the opto-isolator 646 is modeled as an LED connected to ground. When voltage is applied to this LED, light activates a transistor portion of the opto-isolator 646 whose input is connected to the second end of fuse 614. The output of opto-isolator 646 is connected to ground.

A-side power path 328 is coupled to the electronics package 318 through an analog embodiment of the test block circuit 410, the path interrupter 412 and the termination block circuit 414. The analog embodiment of the test block circuit 410 has a TRIAC 647 with a first end coupled to the A-side power path 328 and second side coupled to the first end of resistor 634 and the first end of fuse 636. A first end of a resistor 649 is coupled to the first end of the TRIAC 647 and the A-side power path 328. A second end of resistor 649 is coupled to the gate of TRIAC 647.

An analog embodiment of the termination block circuit 414 includes a TRIAC 648 with a first end connected to the second side of fuse 636 and the anode of SCR 638. A second end of TRIAC 648 is coupled via the power path 322 to the electronics package 318. A first end of a resistor 650 is coupled to the anode of SCR 638 and the second of fuse 636. A second end of resistor 650 is coupled to a gate of TRIAC 648.

Keeping with the symmetrical nature of the circuit 610, an analog embodiment of the test block circuit 416 has a TRIAC 652 with a first end coupled to the B-side power path 330. A second of the TRIAC 652 is coupled to the first end of resistor 620 and the first side of fuse 622. A first end of a resistor 653 is coupled to the first end of TRIAC 652 and the B-side power path 330. A second end of resistor 653 is coupled to the gate of TRIAC 652. An analog embodiment of the B-side termination block circuit 420 includes a TRIAC 654 with a first end coupled to the second end of fuse 622 and the anode of SCR 624. A second end of TRIAC 654 is coupled via the power path 322 to the electronics package 318. A first end of a resistor 656 is coupled to the first end of TRIAC 654, the second end of fuse 622, and the anode of SCR 624. A second end of resistor 656 is coupled to the gate of a TRIAC 654.

Circuit Operation

The operation of circuit 610 illustrated in FIG. 6 will now be explained assuming that the reversible circuit breaker 110 is oriented in the circuit as illustrated in FIG. 2A. The A-side power path 328 is coupled to the line-side path 126 and the B-side power path 330 is coupled to the load-side path 128 or floating (e.g., because of an intervening switch). It is assumed that circuit breaker 110 is open when inserted into the circuit, so that A-side power path 328 and B-side test path 330 are not at the same potential. This initial condition may be ensured, for example, by shipping the reversible circuit breaker 110 with a protective collar (not shown) around reset button or lever 114 that maintains the reversible circuit breaker in the open condition until it is installed. When the line 122 is energized, a voltage will appear on A-side test path 432. This voltage will appear on the second side of resistor 618, which will activate the gates of SCRs 616 and 624 causing them to begin conducting current. With SCRs 616 and 624 closed, the current will flow through resistor 612, fuse 614, through SCR 616, resistor 620, fuse 622, and SCR 624 to ground 626. The cumulative resistances of resistor 612 and 620 will limit the current that flows through fuse 622, but should be of a sufficiently low value to allow current in excess of the capacity of fuse 622 such that the current path to ground blows fuse 622. On the other hand, fuse 614 should have a fuse capacity that exceeds the current permitted by the cumulative values of resistors 612 and 620. In this way, the voltage appearing on A-side power path 328 will blow fuse 622, permanently interrupting the B-side power path 330 from reaching the electronics package 318 through power path 322. While the interruption selector circuit 442 is tending to the interruption of the B-side power path, the test block circuit 416 blocks an electrical path from the first side of fuse 622 to the B-side power path because resistor 653 currently has no voltage to activate TRIAC 652.

With fuse 622 blown and fuse 614 intact, the transistor input of opto-isolator 646 has voltage available but no current path to ground because the control LED is connected to the B-side test path 434 and is not currently activated. Similarly, the LED control input of opto-isolator 642, which is connected to the A-side test path 432, has activated the input of opto-isolator 642, but the transistor input currently has no voltage available because of its connection to the B-side test path 434. The termination block circuit 420 blocks an electrical path between the A-side power path 328 (now available at the power path 322) from reaching the B-side power path 330 because the voltage available on resistor 618 continues to be applied to the gate of SCR 624, which provides a path to ground 626 that pulls resistor 656 low, turning TRIAC 654 off.

Once fuse 622 is blown, permanently interrupting B-side power path 330 from reaching electronics package 318 via the power path 322, the reversible circuit breaker 110 can be closed, for example, by removing the protective collar and pushing button 114. This causes a voltage to appear on the B-side power path 330 as well as the A-side power path 328. The voltage appearing on the B-side power path 330 puts a voltage on resistor 644 and the LED control input to opto-isolator 646. This activates the LED portion of the opto-isolator which, in turn, closes the transistor portion of the opto-isolator 646 creating a path to ground. This path to ground enables a current to flow on A-side power path 328 through resistor 612 and fuse 614 to ground. The resistor 612 is sized to permit a current greater than the capacity rating of fuse 614, allowing a current flowing to ground through opto-isolator 646 to blow fuse 614. This permanently removes removal circuit 438 and interruption selection 442 from circuit 610. Similarly, since the voltage on the A-side test path 432 on resistor 640 and the LED control input of opto-isolator 642 closes the transistor portion of the opto-isolator 642, power is available on B-side test path 434 and current will flow through resistor 628, fuse 630, and opto-isolator 642 to ground. Resistor 628 is sized such that the current in B-side test path 434 exceeds the rated current capacity of fuse 630, thereby blowing fuse 630 when the path to ground 626 is provided by opto-isolator 642.

The availability of the path to ground 626 through opto-isolator 642 pulls resistor 632 to ground potential along with the gates of SCRs 631 and 638. This opens SCRs 631 and 638, protecting fuse 636 during the operation of removal circuits 436 and 438.

The electronics package 318 is now coupled to the A-side power path 328 via TRIAC 647, fuse 636, and TRIAC 648. TRIACs 647 and 648 will remain closed by virtue of the voltage available on the A-side power path 328 supplied via resistors 649 and 650, respectively. The opening of fuses 614 and 622 maintain the permanent isolation between the A-side power path 328 and the B-side power path 330. Due to the symmetrical nature of the circuit shown in FIG. 6, the circuit operation is the same (using corresponding elements) as that just described if the reversible circuit breaker 110 was oriented in the circuit as illustrated in FIG. 2B.

Many substitutions are possible in the embodiment shown in FIG. 6. For example, TRIACs 647, 648, 652, and 654 are incorporated to pass AC signals. If a DC signal is all that is required by a particular application, the TRIACs could be easily replaced with SCRs or any other type of switching device such as FETs, electronic switches, or electro mechanical switches. For that matter, all SCRs, TRIACs, and opto-isolators in circuit 610 could be replaced by electronic switches such as transistors and electro mechanical switches. For instance, if electrical isolation is not a concern, each opto-isolator 642 and 646 could be replaced by FETs with the gate connected to the second end of resistor 640 or 644, the collector connected to the second end of fuse 630 or 614, and the emitter connected to ground 626.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

What is claimed is:

1. A reversible circuit breaker that protects an electrical circuit by interrupting an electrical path between an A-side terminal and a B-side terminal when a fault condition is detected, the reversible circuit breaker including an electronics package that assists in the detection of fault conditions, the electronics package having a power connection, the reversible circuit breaker comprising:
   a power source selection circuit, including:
      an A-side electrical path that electrically couples the A-side terminal to the power connection of the electronics package;
      a B-side electrical path that electrically couples the B-side terminal to the power connection of the electronics package;
      an A-side path interrupter that is interposed in the A-side electrical path between A-side terminal and the power connection of the electronics package; and
      an B-side path interrupter that is interposed in the B-side electrical path between B-side terminal and the power connection of the electronics package.

2. The reversible circuit breaker of claim 1, further comprising:
   a manual selector that causes either the A-side path interrupter to interrupt the A-side electrical path or the B-side path interrupter to interrupt the B-side electrical path.

3. The reversible circuit breaker of claim 1, further comprising:
   an automatic selection circuit that causes either the A-side path interrupter to interrupt the A-side electrical path or the B-side path interrupter to interrupt the B-side electrical path.

4. The reversible circuit breaker of claim 3, wherein the automatic selection circuit includes an interruption selector circuit that causes the A-side path interrupter to interrupt the A-side electrical path when a desired potential is detected on the B-side electrical path and causes the B-side path interrupter to interrupt the B-side electrical path when the desired potential is detected on the A-side electrical path.

5. The reversible circuit breaker of claim 4, further comprising:
   a B-side test block circuit that electrically isolates the B-side power path from the A-side power path while the automatic selection circuit detects a potential on the A-side power path; and
   an A-side test block circuit that electrically isolates the A-side power path from the B-side power path while the automatic selection circuit detects a potential on the B-side power path.

6. The reversible circuit breaker of claim 4, wherein the A-side path interrupter and the B-side path interrupter permanently interrupt the A-side power path and B-side power path, respectively.

7. The reversible circuit breaker of claim 4, wherein the automatic selection circuit further includes a removal circuit that electrically isolates the interruption selector circuit from the A-side terminal or the B-side terminal once the interruption selector circuit has caused the A-side path interrupter to interrupt the A-side electrical path or the B-side path interrupter to interrupt the B-side electrical path.

8. The reversible circuit breaker of claim 7, further comprising:
   a B-side test block circuit that electrically isolates the B-side power path from the A-side power path while the automatic selection circuit detects a potential on the A-side power path; and
   an A-side test block circuit that electrically isolates the A-side power path from the B-side power path while the automatic selection circuit detects a potential on the B-side power path.

9. The reversible circuit breaker of claim 8, wherein the A-side path interrupter and the B-side path interrupter permanently interrupt the A-side power path and B-side power path, respectively.

10. The reversible circuit breaker of claim 9, further comprising:
    a B-side termination block circuit that electrically isolates the B-side power path from the A-side power path when the interruption selector circuit causes the B-side interrupter to permanently interrupt the B-side power path; and
    an A-side termination block circuit that electrically isolates the A-side power path from the B-side power path when the interruption selector circuit causes the A-side interrupter to permanently interrupt the B-side power path.

11. An automatic electrical path selector comprising:
    means for selecting an electrical path having a desired potential from a plurality of electrical paths;
    means for interrupting at least one unselected electrical path in the plurality of electrical paths;
    means for isolating an electrical path under test from other electrical paths in the plurality of electrical paths while the electrical path under test is being tested for the desired potential;
    means for permanently interrupting at least one unselected electrical path from the plurality of electrical paths; and means for isolating the at least one unselected electrical path from other electrical paths in the plurality of electrical paths while the it least one unselected electrical path electrical path is being permanently interrupted.

12. The automatic electrical path selector of claim 11, further comprising means for disconnecting the means for selecting an electrical path from the selected electrical path.

13. The automatic electrical path selector of claim 12, further comprising means for disconnecting the means for interrupting at least one unselected electrical path from the at least one unselected electrical path.

14. The automatic electrical path selector of claim 11, further comprising:

means for permanently interrupting at least one unselected electrical path from the plurality of electrical paths; and means for isolating the at least one unselected electrical path from other electrical paths in the plurality of electrical paths while the at least one unselected electrical path electrical path is being permanently interrupted.

15. The automatic electrical path selector of claim 11, further comprising means for disconnecting the means for selecting an electrical path from the selected electrical path.

16. The automatic electrical path selector of claim 11, further comprising means for disconnecting the means for interrupting at least one unselected electrical path from the at least one unselected electrical path.

17. A method for choosing a power supply path and eliminating at least one alternative power supply path to an electronics package in a circuit breaker, the circuit breaker having a plurality of power supply paths to the electronics package, the method comprising:

testing at least one power supply path for a desired potential; and electrically isolating at least of the one power supply paths comprising the plurality of power supply paths from the electronics package based on the testing.

18. The method of claim 17, wherein a power supply path under test is electrically isolated from other power supply paths in the plurality of power supply paths while the power supply path under test is being tested.

19. The method of claim 18, wherein an electronic switch electrically isolates the power supply path under test from other power supply paths in the plurality of power supply paths.

20. The method of claim 19, wherein electrically isolating at least of the one power supply paths comprising the plurality of power supply paths from the electronics package based on the testing, comprises:

determining a potential from the power supply path; and activating a circuit path terminator in a power supply path among the plurality of power supply paths based on the potential determined from the power supply path.

21. The method of claim 20, wherein the circuit terminator includes a fuse and activating the circuit path terminator comprises blowing the fuse, thereby permanently interrupting the power supply path.

22. The method of claim 21, further comprising:

activating a removal circuit that electrically isolates the circuit path terminator from the electrical path after circuit terminator is activated.

23. A method for installing a reversible circuit breaker having a plurality of terminals, means for coupling and de-coupling an electrical signal between the plurality of terminals and a power source selection circuit, the method comprising:

determining that the electrical connection between the plurality of terminals is de-coupled;

coupling a power signal to a terminal in the plurality of terminals;

coupling a load to another terminal in the plurality of terminals; and coupling an electrical signal from the terminal to the other terminal.

24. The method of claim 23, wherein the reversible circuit breaker is plugged into a slot in a circuit breaker panel.

25. The method of claim 24, wherein both the reversible circuit breaker and the slot are symmetrical such that the reversible circuit breaker can be plugged into the slot in the circuit breaker panel in any one of multiple orientations.

* * * * *